United States Patent [19]
Pultorak

[11] Patent Number: 5,424,804
[45] Date of Patent: Jun. 13, 1995

[54] AUTOMATIC EXPOSURE CONTROL USING DENSITY SLOPE CONTROL FOR A PLANETARY MICROFILMER

[75] Inventor: David M. Pultorak, Rochester, N.Y.
[73] Assignee: Eastman Kodak Company, Rochester, N.Y.
[21] Appl. No.: 216,898
[22] Filed: Mar. 23, 1994
[51] Int. Cl.⁶ .................... G03B 27/74; G03B 27/80
[52] U.S. Cl. ........................................ 355/68; 355/77
[58] Field of Search ................ 355/68, 77; 354/413, 354/412, 435, 456

[56] References Cited

U.S. PATENT DOCUMENTS

| | | | |
|---|---|---|---|
| 3,704,947 | 12/1972 | Reimann | 355/68 |
| 3,795,445 | 3/1974 | Hamlin et al. | 355/68 |
| 3,947,112 | 3/1976 | Hahn et al. | 355/68 |
| 4,148,579 | 4/1979 | Axelrod | 355/77 X |
| 4,433,908 | 2/1984 | Omi et al. | 355/68 |
| 4,632,540 | 12/1986 | Shiga | 355/68 |
| 4,920,378 | 4/1990 | Vinatzer | 355/68 |
| 4,984,015 | 1/1991 | Okino | 355/68 |
| 5,095,328 | 3/1992 | Mizoguchi | 355/68 |
| 5,146,267 | 9/1992 | Riley | 355/68 |

Primary Examiner—Richard A. Wintercorn
Attorney, Agent, or Firm—Dennis R. Arndt

[57] ABSTRACT

A method and apparatus for establishing optimum film exposure time for documents of different reflectances, A photo-sensor is used to produce a signal proportional to the intensity of light reflected from the document to be microfilmed, The signal is integrated and a time is determined for the integrated signal to reach a threshold or reference value, The time needed to reach the threshold value is measured very accurately by a microprocessor, The measured time is then convened to new time by using a look-up table, The new or desired shutter time is controlled by the microprocessor by terminating the exposure when the total time the shutter was open equals new exposure time found in this look-up table.

12 Claims, 9 Drawing Sheets

AUTOMATIC EXPOSURE CONTROL USING DENSITY SLOPE CONTROL FOR A PLANETARY MICROFILMER

BACKGROUND OF THE INVENTION

1. Field of the Invention

The present invention relates to slope control exposure control apparatus for use in document reproducing apparatus such as planetary microfilmers and, more particularly, where a microprocessor is used to control the shutter time based upon a signal level from a sensor that determines the reflectiveness of a document and a look-up table that controls the shutter operation.

2. Description of the Prior Art

When using a planetary microfilmer, it is desirable to have the capability of automatically exposing the documents to their optimum film density level. Some planetary microfilmers typically use sensors to determine the reflectance of a document. Once the reflectance is known, the shutter speed is controlled to achieve some target density. This may be the same film density for the full range of document reflectances. This does not optimize performance of a printer that produces prints of low reflectance, low contrast documents. It is best to expose the film at a lower film density in the case of a low contrast document. This change in film density as a function of document density is called an exposure slope.

U.S. Pat. No. 3,795,445, issued Mar. 1, 1974, entitled "Slope Control Exposure Apparatus" describes an apparatus for creating a film exposure slope. A portion of the light that is used to illuminate the documents is combined with the light reflected from the document and collected on a photosensor. In this way, the film density will drop as a function of lower document reflectances. This design requires additional optics and involves critical alignment for proper operation.

U.S. Pat. No. 5,146,267, issued Sep. 8, 1992, entitled "Reflectance Based Microfilming Process" describes a process for optimizing film exposure by controlling the illumination level of the document based upon a light meter reading for reflectance. Sample targets of background hues are used to establish calibration points and the operator adjusts the document illumination in accordance with a reference spreadsheet. In the present invention, no sample targets are required so there is no need to create the sample calibration film.

SUMMARY OF THE INVENTION

The invention is used to create an optimum film exposure time for documents of different reflectances, and partially compensates as the illumination source output changes with time. The operator establishes a proper nominal set point for shutter time for a given document. A photo-sensor is used to produce a signal proportional to the intensity of light reflected from the document to be microfilmed. The signal is integrated and a time is determined for the integrated signal to reach some threshold value. The time needed to reach the threshold value is measured very accurately by a microprocessor. The time value is then compared to a look-up table to determine what the optimum shutter time should be. The shutter time is then controlled by the microprocessor and an optimum film exposure is created.

The present invention provides an apparatus for controlling the exposure of a camera, the apparatus comprising means for supporting a document to be photographed and means for controlling the opening and closing of a shutter. Means are provided for illuminating the document and measuring the reflected illumination and generating a first signal, the level of which is proportional thereto. Means are further provided for comparing the first signal level with a reference signal level and generating a trip signal when said signal levels are equal and measuring means in response to said trip signal. Look-up table means are provided for adjusting the exposure time of the film so that the film density is reduced for documents having lower reflectance and closing the shutter after a time period equal to the adjusted exposure time has elapsed.

BRIEF DESCRIPTION OF THE DRAWINGS

This and other objects and features of the present invention will become clear from the following description taken in conjunction with preferred embodiments thereof with reference to the accompanying drawings in which.

DESCRIPTION OF THE PREFERRED EMBODIMENT

Figure 1:
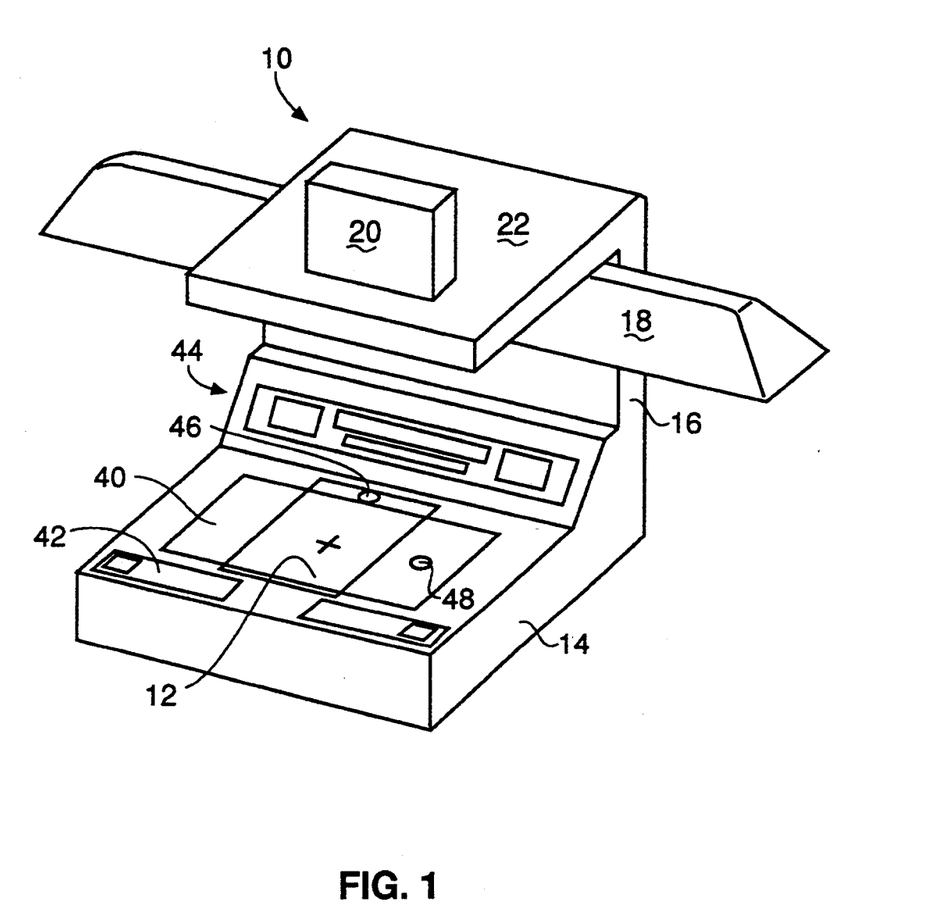
FIG. 1 is a schematic perspective view of the microfilm camera according to the present invention.
Figure 2:
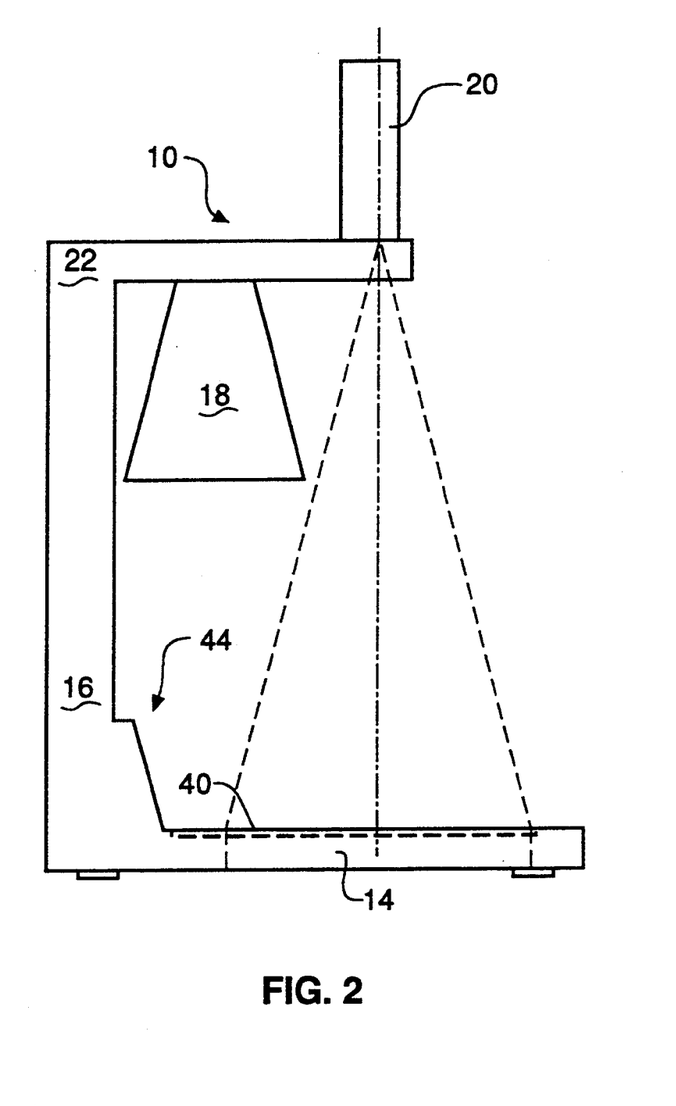
FIG. 2 is a side elevational view of the microfilm camera shown in FIG. 1.

Referring first to FIGS. 1 and 2 a microfilm camera generally identified by 10 is so far shown, employed in the form of a planetary camera or so-called planar type camera and is so designed that an actual photo-taking can take place while a document 12 to be microfilmed and the photosensitive microfilm is held stationary.

The microfilm camera 10 comprises a generally rectangular base 14 having a pair of long side edges and a pair of short side edges and also having a support member 16 erected so as to extend upwardly from the long side edge of the base 14. The support member 16 has a generally elongated illuminator lamp 18 mounted on support member 16 and extending along one of the long side edges of the base 14. Use of this type of illumination lamp does not disturb the operator when turning over leaves of the original documents being photographed. A camera housing 20 of a generally box-like configuration is mounted on a cantilevered shelf 22, one side of what is attached to the support member 16.

Figure 3:
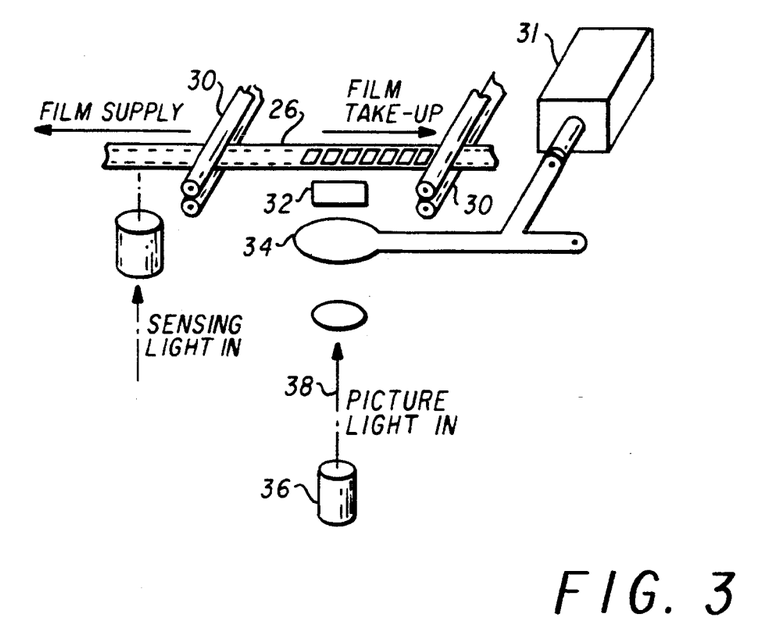
FIG. 3 is a schematic diagram showing the sensing light for the exposure control and the lens and shutter controlling light along the optical path of the camera.

Within the camera housing 20, there is accommodated a photosensitive film supply 26, a film take-up with intermediate feed rollers 30 are disposed in spaced relation to each other along the path of the transport of the microfilm from the film supply towards the film take-up (see FIGS. 3). An aperture 32 positioned intermediate between the feed rollers 30 (not shown), a shutter 34 (FIG. 3) supported generally below the aperture 32, and a zoom lens assembly 36 disposed immediately below the aperture 32.

When a microfilm recording is to be made, each frame of the microfilm is transported from the film supply onto the film take-up as is well known in the art. The film is stopped and held stationary at a position immediately above the aperture 32 and the image of the document is registered through an aperture 32 formed in a plate not shown and then through the zoom lens assembly 36 with a document placed on the document support table 40 of the base 14. The shutter 34 (FIG. 3) is adapted to selectively open and allow the image of the document to pass through both the lens assembly 36 and the aperture 32 to form an image on the microfilm 26 in a frame determined by the aperture 32. After the exposure has been made for a predetermined time, the shutter 34 is closed, blocking the light along the optical path 38 of the camera.

The lens assembly 36 is comprised of a zoom mechanism so that original copies of different sizes can be photographed onto the same sized screen by the zooming operation without the vertical level of the camera housing 20 needing to be changed.

The document support table 40 is positioned immediately below the camera housing 20 mounted on the cantilevered shelf 22. The illuminator lamp 18 that extends parallel to the long side edge of the base 14 such that it provides uniform light on any documents placed on the support table 40. The base 14 also has a generally elongated control console 42 mounted thereon so as to extend along the other long side edge thereof. A rear control panel 44 is also mounted along the long side edge of the base 14 where the support member 16 joins the base 14.

The document support table 40 has a pair of reflective sensor windows 46 and 48 when a document is placed thereon the image is projected through lens assembly 36 to form a latent microfilmed image on the strip of microfilm 26. A standard reflective sensor 46 is mounted on the support table 40 to detect when a document needs to be reduced by a factor of 30×. This provides a means for automatically detecting an oversized document and changing the magnification of the zoom lens assembly 36 to properly image the document. A second reflective sensor 48 is used to determine the need to enlarge the frame size imaged on the microfilm and use double frame image. The description to follow will be limited to single frame size documents as the photographing of double images is beyond the scope of the present invention.

It is to be noted that in practice of the present invention, instead of the photoconductive detector, an ultrasonic detector, a limit switch or any other detector may be employed for the size sensors 46 and 48.

When in use, the illumination lamp 18 illuminates the document placed on the document support table 40 and an image of the document is reflected towards the camera housing 20. If, at this time, the shutter 34 is in an open position clearing the optical path between the lens assembly 36 and the aperture 32, one of the frames of the microfilm then is aligned with the aperture 32 and is exposed to the reflected rays of light from the image. Which are, after having entered the camera housing 20, traveling towards the microfilm 26 through the zoom lens assembly 36 and then through the aperture 32. In this way, that frame of the microfilm carries a latent image corresponding to an image of the document which will subsequently be developed into a negative or positive microfilmed image. After the microfilm is completely wound on the take-up reel (not shown), it is then developed.

Referring now to FIGS. 3, the operation of the shutter 34 will be described.

As best shown in FIG. 3, the shutter 34 is adapted to selectively open and intercept the optical path 38 between the lens assembly 36 and the microfilm. The shutter is controlled by a solenoid 31 with the shutter normally being biased in the closed position.

An automatic exposure control system which includes a sensor in the camera 20 near lens assembly 36. This signal is used to control the shutter 34 in the camera 20. This results in more precise exposure times with respect to both shutter variation from camera to camera and various document reflectance characteristics.

Figure 4:
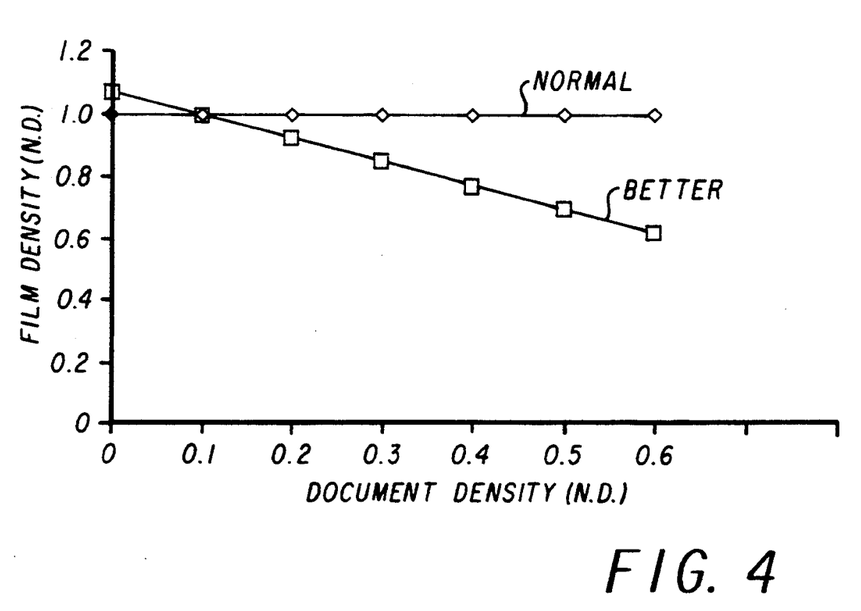
FIG. 4 graphically illustrates a typical film density versus document density exposure curve and the new, more desirable exposure curve in accordance with the present invention.

As shown in FIG. 4, typical planetary microfilmers use an exposure system that attempts to provide a film density that does not depend on the density of the document being filmed. The curve (identified with the diamonds) shows that the film density is set at 1.0 for the high reflectance documents having a neutral density of 0.1 and remains constant for the low reflectance documents having a neutral density of 0.6. This, however, is not necessarily the best solution when one considers that the contrast of low reflectance documents is usually low. Assuming the standard document is to be dark printing on a light background, the light background portion of the document is intended to expose the film while the dark characters of the document are not intended to expose the film at all. If a low contrast document is exposed to a neutral density of 1.0, the dark printing on the document will create a partial film exposure and result in an undesirable image. However, in accordance with the present invention, a sloped exposure curve (identified by squares) is used and the background will expose the film at a lower level. With this curve, the dark characters will also expose at a lower level and approach the desired response of having a minimal exposure. This results in a much more readable image.

Figure 7:
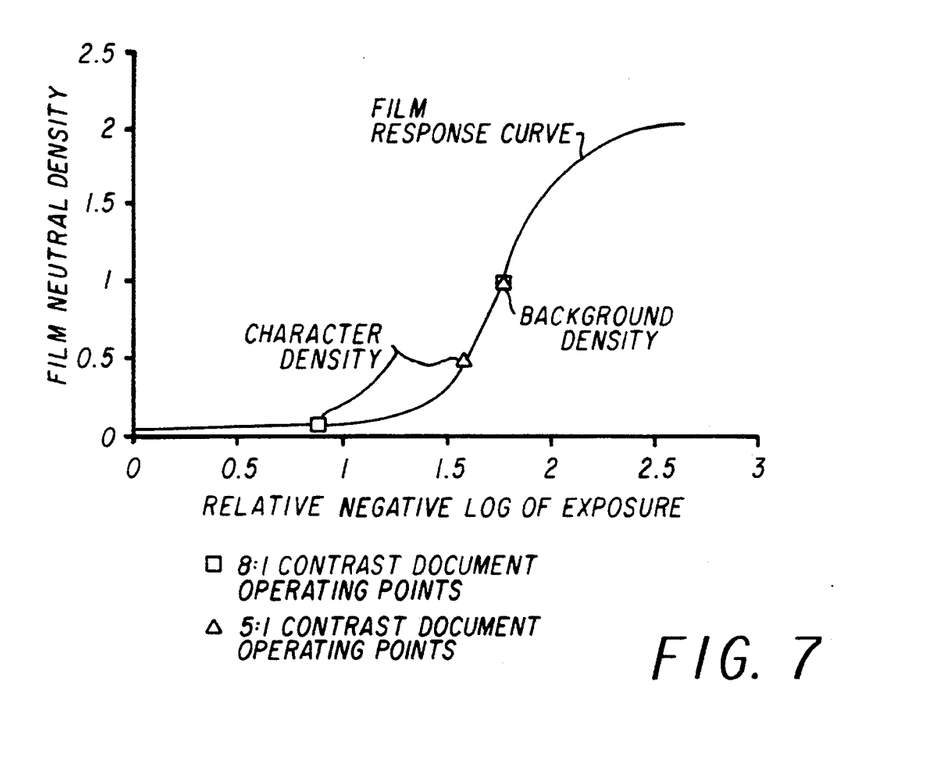
FIG. 7 graphically illustrates film neutral density versus the log of exposure using the constant slope exposure curve shown in FIG. 4.

The advantages of using density slope can be appreciated in the following example and graph shown in FIG. 7. A typical document has dark characters on a light background. The reflectance of the light background is typically 80% and the reflectance of the characters is usually 10%. Therefore, the contrast of the typical document is 8:1. If both of these documents were exposed on film to a background density of 1.0, the high contrast document would have a character density of 0.08 while the low contrast document would have a character density of 0.50.

Figure 8:
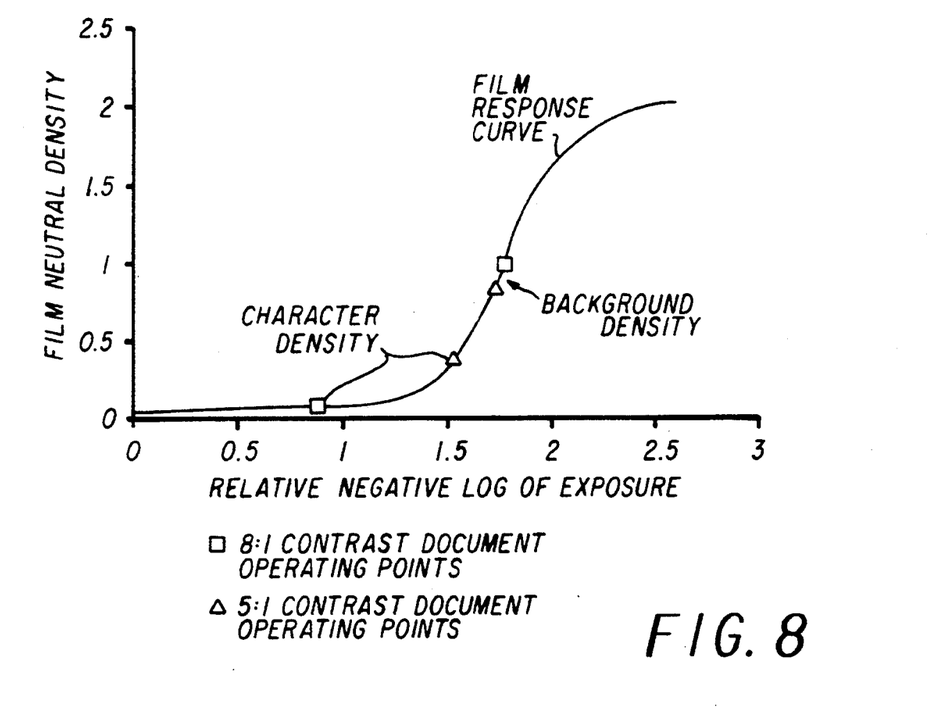
FIG. 8 graphically illustrates film neutral density versus the log of exposure using the new, more desirable slope in accordance with the present invention.

Turning our attention to FIG. 8, one can note the operating points on the film density versus exposure curve for the present invention. If the same document was filmed with the new slope, the low contrast document would have a background density on film of 0.85 and the character density would be 0.39. FIG. 8 illustrates the operating points on the film density versus exposure curve using the new slope.

Figure 9:
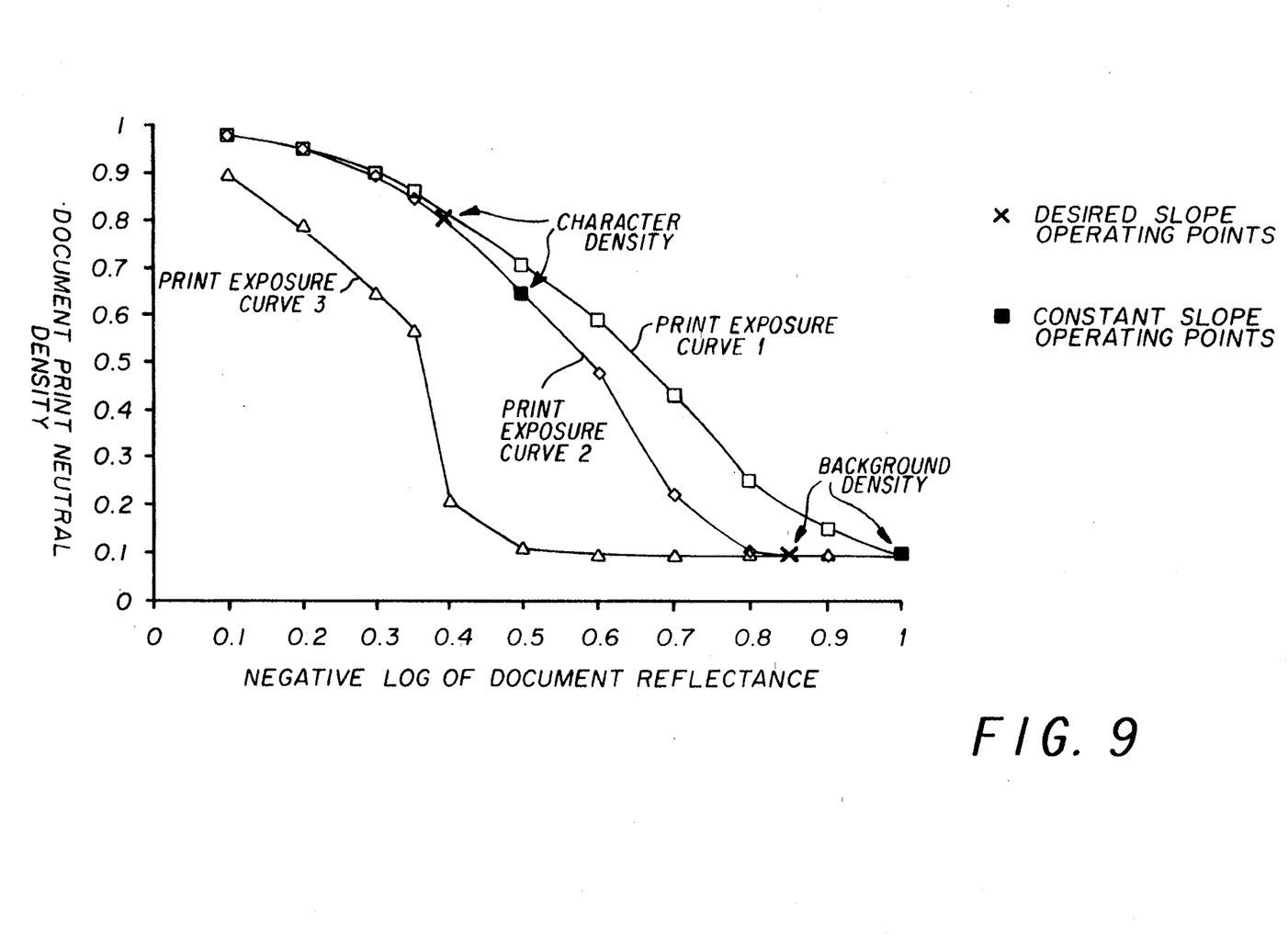
FIG. 9 shows a typical printer density curve plotting film neutral density versus document print neutral density for three different exposure curves for a printer.

One must remember it is the net result or the print on the paper that is the final goal. Therefore, the transfer function of the printer must be included. The exposure curve for a printer is shown in FIG. 9. There are different curves depending on the exposure level that the printer is set. Assuming the printer exposure level is set at 2. The 5:1 contrast document is printed on the film with a film background density of 1.0, the print background will be 0.095 (shown by the "■" on the lower right of the graph) and the characters will be 0.645 (shown by the "■" in the center portion of the graph of FIG. 9). If, on the other hand, the 5:1 contrast document is printed on film with a background density of 0.85, the print background will be 0.097 (shown by "X" on the lower right of the graph) and characters will be 0.805 (shown by "X" in the center portion of the graph). Thus, the end result is a print with a contrast of 0.55 neutral density (3.5:1) if a constant exposure slope was used. However if the new improved slope was used, the print contrast would be 0.708 neutral density (5.1:1). Thus, it can be seen that there is considerable improvement in the final print.

Figure 5:
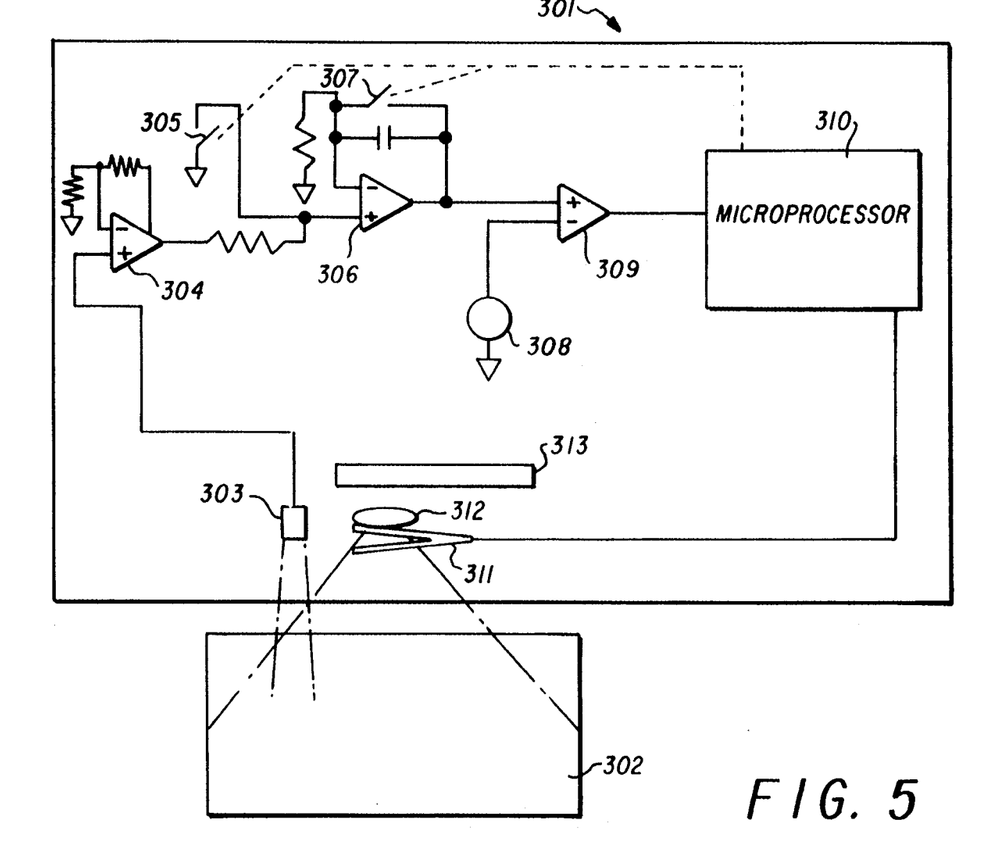
FIG. 5 is a block diagram of the threshold circuit used to create the exposure slope.
Figure 6:
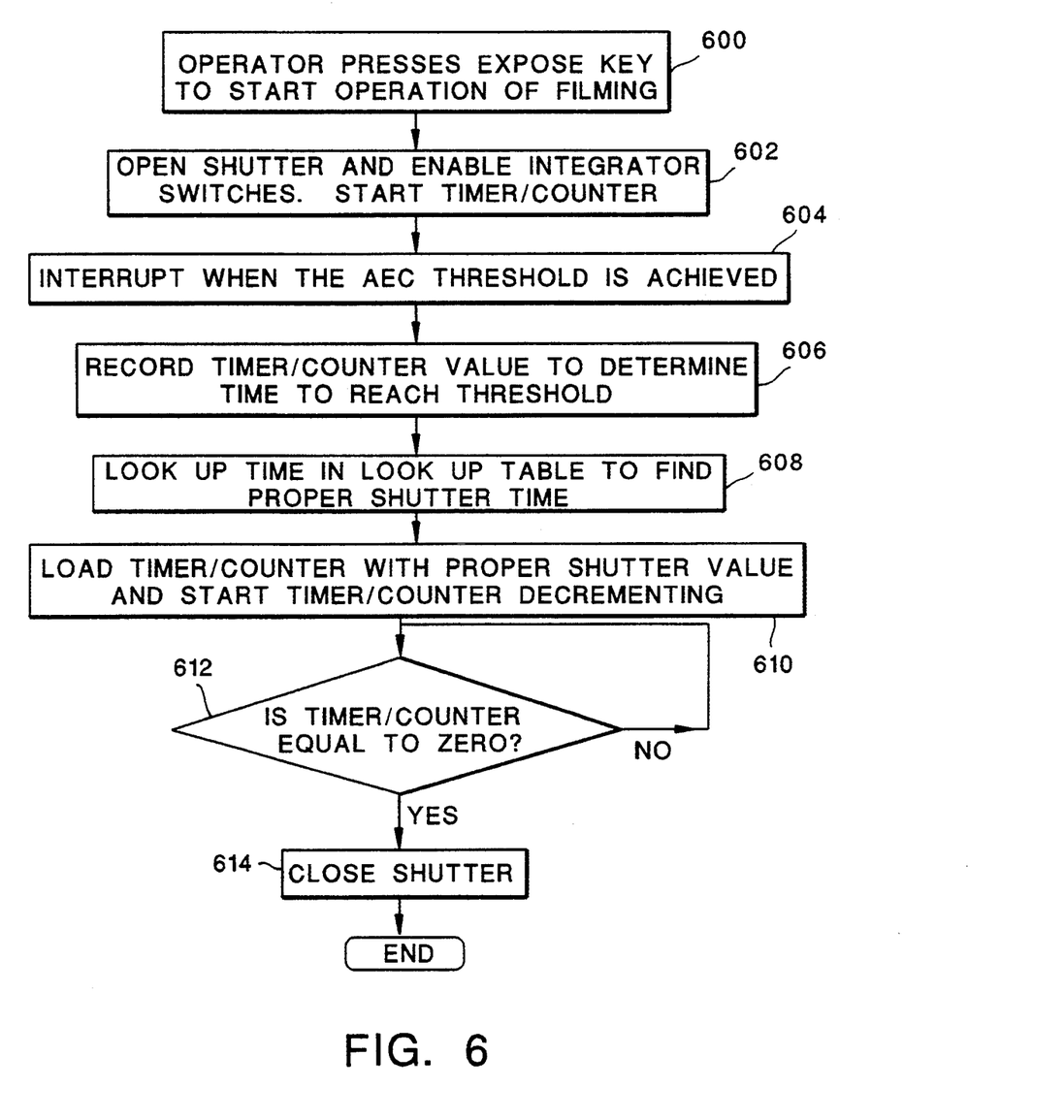
FIG. 6 is a flow chart of the software operational steps for the slope generation.

As shown in FIG. 5, the circuit to achieve the desired slope is described, the luminance of a document 302 is measured by the sensor 303. The sensor creates a signal that must be amplified and integrated. The amplifier 304 produces a voltage that is in proportion to the light reflected from the document. In this implementation, there is only a positive voltage power supply used, hence requiring non-inverting amplifiers. The amplifier switch 305 is used to guarantee that the voltage output at the integrator 306 is low when the integrator switch 307 is closed. The integrator 306 produces a voltage that starts at zero volts and increases over time once the switches 305 and 307 are opened. Both switches 305 and 307 are controlled by the microprocessor 310 and are open when the shutter 311 is opened. The document exposure on film starts at this time. When the voltage reaches a point higher than $V_{ref}$308, the output of the threshold comparator 309 will change from a logic level low to a logic level high. For design convenience, the reference voltage was selected as 0.5 Vcc. The microprocessor 310 will be interrupted and it will then determine the time it took to trip the threshold comparator 309. The microprocessor 310 will then use a look-up table of time increments to determine the appropriate shutter time required to properly expose the document. At the correct time, the shutter 311 will be controlled to close. The rise time for the integrator 306 to trip the threshold comparator 309 is chosen to be significantly faster than the actual shutter time. In this example, the time required to generate a trip signal and interrupt the microprocessor is 10% of the actual shutter time required. This allows enough time for the microprocessor 310 to determine the shutter time from the look-up table and close the shutter within the proper shutter time. The software flow chart is shown in FIG. 6.

In box 600, the operator will press the exposure key and start the filming operation. In step 602, the shutter opens and enables the integrator switches to start the integration. A counter/timer is started incrementing at a known frequency. The integration time is the count value divided by the counter frequency. In step 604, an interrupt is produced at the microprocessor when the AEC threshold is achieved. In step 606, the counter/timer value to reach the threshold is measured and recorded. In step 608, a look-up table is used to look that counter value up to determine what the proper shutter time should be. The count value is loaded into a timer/counter in step 610, subtracted by the integration count value, and begins decrementing. In step 612, a determination is made to see if the timer has decremented to zero. Of course, if yes, the shutter is closed in step 614 and the program is terminated. However, if the answer is no, it is not the correct time to close the shutter and the microprocessor will continue to loop until the answer is yes. As an alternative, this could also be implemented by interrupting the microprocessor when the shutter close timer has decremented to zero.

Figure 10:
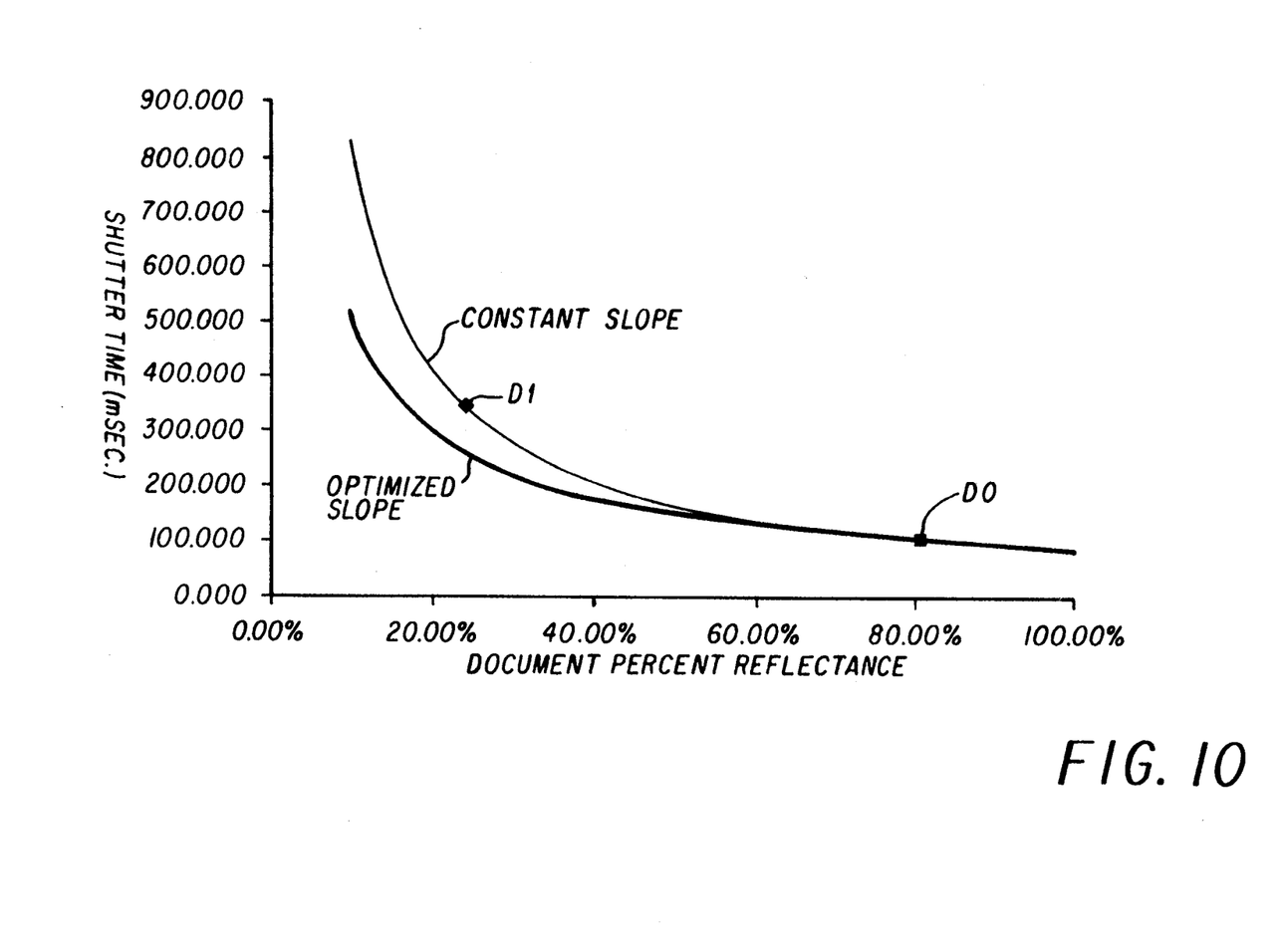
FIG. 10 graphically illustrates shutter time versus the log of document percent reflectance for both constant slope and the desirable new slope of the present invention.

A typical graph for shutter time versus document reflectance is shown in FIG. 10. The curve may be created empirically or estimated if one shutter time point is known that creates a proper film density for a given document reflectance. The equation is defined as:

$$S1 = S0 \ 10^{[D1-D0+\frac{(F1-F0)}{P}]} \quad (1)$$

where:

D0 is the negative log of the reflectance of a white bond document;

D1 is the negative log of the reflectance of another document on the graph;

S0 is the shutter time for the white bond document;

S1 is the shutter time for the other document;

F0 is the density on film of the white bond document; and

F1 is the density on film of the other document.

Figure 11:
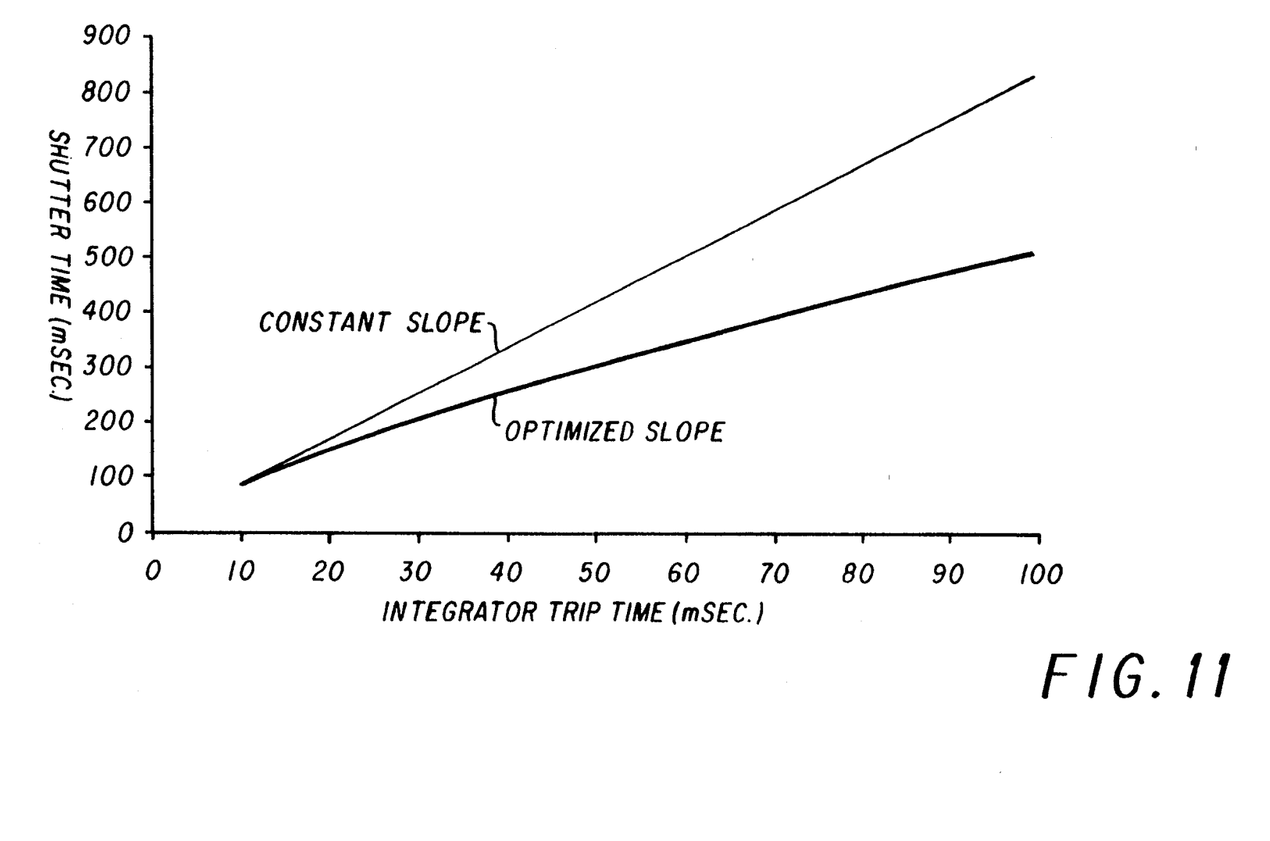
FIG. 11 graphically illustrates shutter time in milliseconds versus integrator trip time also in milliseconds for both the constant slope exposure curve and the new desired exposure curve of the present invention.

P is the sensitivity of film density with respect to exposure time. In this case, let P=3.2. The graph in FIG. 11 illustrates the shutter time versus integrator trip time. This graph results by converting the document reflectance to shutter trip time by substituting:

D1=LOG(KT1) and D0=LOG(KT0)

into Equation (1). The resultant equation is:

$$T1 = \frac{T0S1}{S0} \ 10^{\frac{(F0-F1)}{P}} \quad (2)$$

where:

T0 is the integrator trip time for the white bond document; and

T1 is the integrator trip time for the other document.

K is the multiplication constant for trip time to document reflectance.

It should be noted that the integrator trip time is significantly faster than the actual shutter time. In FIGS. 10 and 11, the value for F1-F0=0 for the constant slope curve and F0-F1=0.30 for a document with density of 0.50 for optimized slope curve. An example look-up table is shown below:

| Comparator Trip Time (msec.) | Desired Slope Shutter Time (msec.) |
| --- | --- |
| 10.0 | 83 |
| 10.2 | 85 |
| 10.5 | 87 |
| 10.7 | 89 |
| 11.0 | 91 |
| 11.2 | 93 |
| 11.5 | 95 |
| 11.7 | 98 |
| 12.0 | 100 |
| 12.3 | 102 |
| 12.6 | 104 |
| 12.9 | 106 |
| 13.2 | 108 |
| 13.5 | 110 |
| 13.8 | 112 |
| 14.1 | 114 |
| 14.5 | 116 |

It should be understood that the use of an integrator to measure the reflected illumination from the document is a preferred embodiment that provides the greatest accuracy in obtaining the desired exposure curve. However, using the output directly from a photosensor could be used to obtain the desired exposures using a look-up table calibrated to use the output level of such a photosensor but the accuracy of such an apparatus would be compromised.

While the invention has been described in conjunction with the specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

I claim:

1. An apparatus for controlling the exposure of film in a camera, said apparatus comprising:
   supporting a document to be photographed;
   means for controlling the opening and closing of a shutter;
   means for measuring time from the time the shutter is opened;
   means for illuminating a document;
   means for measuring the level of light reflected from the document;
   look-up table means for converting level of reflected light into an exposure time for the shutter;
   generating a stop signal when the measuring means reach said exposure time and;
   closing the shutter and terminating the exposure in response to said stop signal.

2. An apparatus for controlling the exposure of film in a camera, said apparatus comprising:
   supporting a document to be photographed;
   means for controlling the opening and closing of a shutter;
   means for measuring time from the time the shutter is opened;
   means for illuminating a document;
   means for measuring the level of light reflected from the document;
   means for calculating a new exposure time for the shutter based on the level of reflected light;
   generating a stop signal when the measuring means reach said exposure time and;
   closing the shutter and terminating the exposure in response to said stop signal.

3. Apparatus for controlling the exposure of film in a camera, said apparatus comprising:
   means for supporting a document to be photographed on a platform;
   means for controlling the opening and closing of a shutter;
   means for measuring time from the time the shutter is opened;
   means for illuminating a document;
   means for measuring the reflected illumination and generating a first signal, the level of which is proportional thereto;
   means for comparing said first signal level with a reference signal level and generating a trip signal when said signal levels are equal;
   recording the measured time of said time measuring means in response to said trip signal;
   look-up table means for converting said recorded measured time period into an exposure time for the shutter;
   continuing to measure the time the shutter is opened and generating a stop signal when said exposure time is reached; and
   closing the shutter and terminating the exposure in response to said stop signal.

4. Apparatus for controlling the exposure of film in a camera, said apparatus comprising:
   means for supporting a document to be photographed on a platform;
   means for controlling the opening and closing of a shutter;
   means for measuring time from the time the shutter is opened;
   means for illuminating a document;
   means for measuring the reflected illumination and generating a first signal, the level of which is proportional thereto;
   means for comparing said first signal level with a reference signal level and generating a trip signal when said signal levels are equal;
   recording the measured time of said time measuring means in response to said trip signal;
   means for calculating a new exposure time for the shutter based on the level of reflected light;
   continuing to measure the time the shutter is opened and generating a stop signal when said exposure time is reached; and
   closing the shutter and terminating the exposure in response to said stop signal.

5. The apparatus as set forth in claim 4 wherein the converted exposure time for controlling the shutter to expose the film so that the film density is reduced for documents having a lower reflectance.

6. Apparatus for controlling the exposure of film in a camera, said apparatus comprising:
   means for supporting a document to be photographed;
   means for controlling the opening and closing of a shutter;
   means for illuminating a document;
   means for measuring the reflected illumination and generating a first signal, the level of which is proportional thereto;
   means for comparing said first signal level with a reference signal level and generating a trip signal when said signal levels are equal;

recording the measured time of said measuring means in response to said trip signal;

look-up table means for adjusting the exposure time of the film so that the film density is reduced for documents having lower reflectances; and closing the shutter after a time period equal to the adjusted exposure time has elapsed.

7. An apparatus for controlling the exposure of film in a microfilm camera, said apparatus comprising:

a platform for supporting a document to be photographed;

a solenoid for the opening and closing of a shutter;

a counter/timer measures the time that the shutter is opened;

at least one lamp for illuminating said document to be photographed;

a light sensor for measuring the amount of illumination reflected by said document and providing a signal proportional to the level thereof;

recording the measured time from said counter/timer by dividing the count value by the counter frequency;

converting the measured time using a look-up table to obtain a new exposure time for the shutter;

continue to measure the time until the new exposure time is reached and producing a stop signal; and terminating the exposure by closing the shutter in response to said stop signal.

8. A method of controlling the exposure of film in a camera comprising the steps of:

supporting a document to be photographed;

controlling the opening and closing of a shutter;

measuring the time the shutter is opened;

illuminating a document;

measuring the reflected illumination and generating a first signal, the level of which is proportional thereto;

comparing said first level signal with a reference signal level and generating a trip signal when said signal levels are equal;

recording the measured time when said trip signal is generated;

converting the recorded measured time period using a look-up table into a new exposure time; and closing the shutter and terminating the exposure in response to said new exposure time.

9. The method as set forth in claim 8 wherein the converted exposure time exposes the film so that the film density is reduced for documents having a lower reflectance.

10. A method for controlling the exposure of film in a camera, said method comprising the steps of:

supporting a document to be photographed;

controlling the opening and closing of a shutter;

measuring time from the time the shutter is opened;

illuminating said document;

measuring the level of light reflected from the document;

converting the level of reflected light using a look-up table into an exposure time for the shutter;

generating a stop signal when the measuring means reaches said exposure time; and closing the shutter and terminating the exposure in response to said stop signal.

11. A method for controlling the exposure of film in a camera, said method comprising the steps of:

supporting a document to be photographed;

controlling the opening and closing of a shutter;

measuring time from the time the shutter is opened;

illuminating said document;

measuring the level of light reflected from the document;

calculating a new exposure time for the shutter based on the level of reflected light;

generating a stop signal when the measuring means reaches said exposure time; and closing the shutter and terminating the exposure in response to said stop signal.

12. A method of controlling the exposure of film in a camera comprising the steps of:

supporting a document to be photographed;

controlling the opening and closing of a shutter;

measuring the time the shutter is opened;

illuminating a document;

measuring the reflected illumination and generating a first signal, the level of which is proportional thereto;

comparing said first level signal with a reference signal level and generating a trip signal when said signal levels are equal;

recording the measured time when said trip signal is generated;

calculating a new exposure time for the shutter based on the trip signal time; and closing the shutter and terminating the exposure in response to said new exposure time.

* * * * *